(12) United States Patent
Hauser

(10) Patent No.: US 6,371,101 B1
(45) Date of Patent: *Apr. 16, 2002

(54) SLICING DEVICE USING YARN FOR CUTTING THIN WAFERS USING THE ANGULAR INTERSECTION OF AT LEAST TWO YARN LAYERS

(75) Inventor: Charles Hauser, Genolier (CH)

(73) Assignee: HCT Shaping Systems SA, Cheseaux (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,366

(22) PCT Filed: Feb. 13, 1998

(86) PCT No.: PCT/IB98/00180

§ 371 Date: Nov. 8, 1999

§ 102(e) Date: Nov. 8, 1999

(87) PCT Pub. No.: WO98/50209

PCT Pub. Date: Nov. 12, 1998

(30) Foreign Application Priority Data

May 7, 1997 (CH) ............................................... 1067/97

(51) Int. Cl.[7] .............................. B28D 1/06; B28D 7/06
(52) U.S. Cl. ................ 125/16.01; 83/651.1; 83/699.31; 83/699.51
(58) Field of Search ................................ 83/651.1, 807, 83/699.21, 699.31, 699.41, 699.51, 699.61; 125/16.01, 16.02, 21

(56) References Cited

U.S. PATENT DOCUMENTS 4,084,469 A * 4/1978 Gray ..................... 83/651.1 X
4,393,450 A * 7/1983 Jerard ................... 83/651.1 X
4,494,523 A * 1/1985 Wells ........................ 125/21 X
4,608,893 A 9/1986 Hühne ........................ 83/171
5,052,366 A * 10/1991 Matsukura ............... 125/16.01
5,628,301 A * 5/1997 Katamachi ................... 125/21
5,913,305 A * 6/1999 Hauser ..................... 125/16.02
6,041,766 A * 3/2000 Vojtechovsky ........... 125/16.02
6,145,422 A * 11/2000 Katamachi et al. ..... 83/651.1 X

FOREIGN PATENT DOCUMENTS

| DE | 154 646 | 9/1904 |
| DE | 195 17 107 | 11/1995 |
| EP | 0 406 019 | 1/1991 |
| EP | 0 745 464 | 12/1996 |
| JP | 61-288995 | 12/1986 |
| WO | WO 91/12915 | 9/1991 |
| WO | WO 97/32681 | 9/1997 |

* cited by examiner

*Primary Examiner*—Rinaldi I. Rada
*Assistant Examiner*—Charles Goodman
(74) *Attorney, Agent, or Firm*—Young & Thompson

(57) ABSTRACT

A slicing device using yarn includes at least two yard-guide cylinders on which the yarn is wound and by which the yarn can be moved with a reciprocating or continuous motion pressed against a piece to be sliced fixed on a supporting table. The yarn is wound on the yarn-guide so as to form at least two layers of yarn intersecting with one or several non-null intersecting angles (β) and so as to pass in a straight line from one cylinder to the other. The angle of inclination between the moving direction of the piece to be sliced and a line perpendicular to the plane of the yarn cylinder axes is adjustable so as to obtain strictly parallel slices. The intersection of the yarn layers improves the quality of slices obtained by facilitating the subsequent mechanical treatment operations of surfaces with crossed faults. Moreover, the angle of the yarn layers reduces the shearing and torsional stresses on the support of the piece to be sliced when the slices are being cut.

10 Claims, 5 Drawing Sheets

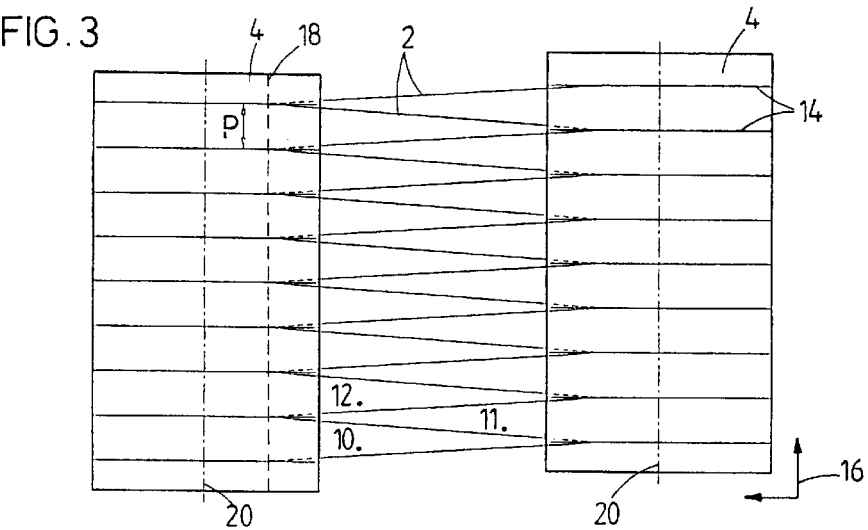
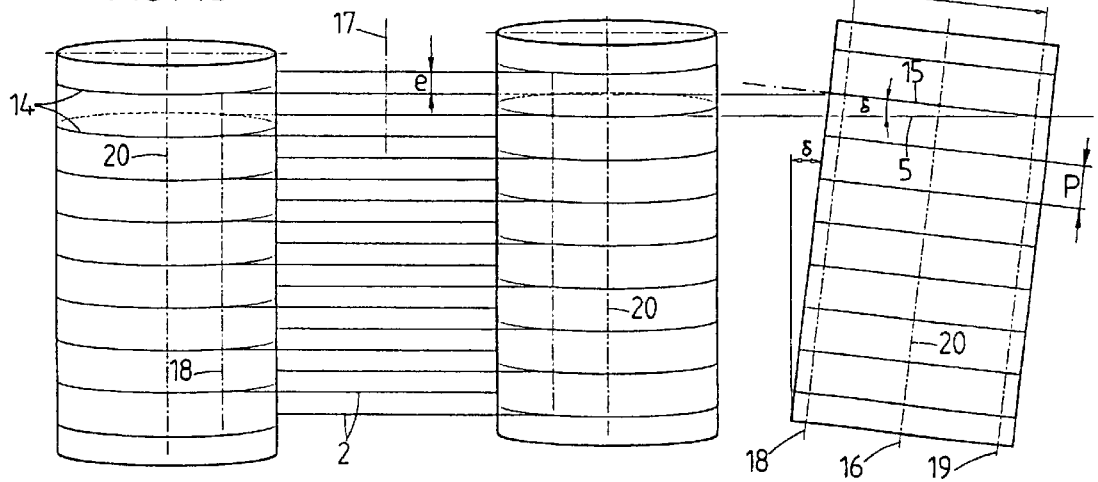
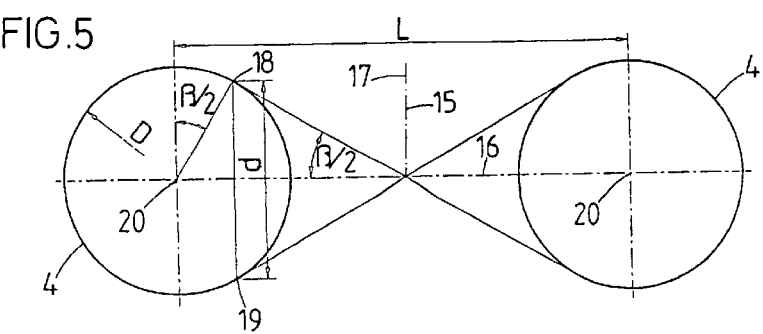

SLICING DEVICE USING YARN FOR CUTTING THIN WAFERS USING THE ANGULAR INTERSECTION OF AT LEAST TWO YARN LAYERS

BACKGROUND OF THE INVENTION

The present invention relates to a wire sawing device comprising at least two wire guide cylinders supporting a wire held in position by grooves provided on the surface of said wire guide cylinders which define the spacing between the wires of a layer of wires, the wire being adapted to move reciprocatingly or continuously while bearing against a piece to be sawed fixed to a supporting table, the winding of the wire about the wire guide cylinders generating at least two layers of wires that cross along at least one line at an angle greater than zero, the wire being wound about each of the wire guide cylinders over an angle of at least 120° of the circumference of the cylinder.

During cutting of thin layers from the piece to be sawed, the stretched wire is both guided and driven by the wire guide cylinders. These wire guide cylinders generally coated with a synthetic layer are engraved with grooves whose shape and dimensions must be quite precise. The wire is spirally wound about two or more wire guide cylinders and forms between two wire guide cylinders at least one layer of parallel wires whose spacing between adjacent wires determines the thickness of the slices. Because of the spiral winding, all the wires of the layer of wires move parallel, generating a force perpendicular to the advance of the supporting table and imposing shear and torsion forces on the mechanism for holding the piece to be sawed. These forces are a function of the speed of sawing and of the dimensions of the piece to be sawed and can result in carrying off the piece to be sawed from its support. The tensions produced at the base of the piece to be sawed lead to deformations which after sawing show us as warping of the obtained slices. Moreover, the plane of the layer of wires is in the known devices such as, for example the one described in the document No. 91/12915, generally perpendicular to the direction of sawing, which can lead to waves on the surfaces of the slices in the case of general movement of the layer of wires resulting from thermal variations for example. These waves, although of several micrometers, are great enough to render the slices unusable for certain applications such as silica for the semiconductor industry.

SUMMARY OF THE INVENTION

The document JP-61-288995 discloses a device comprising the characteristics set forth in the preamble of the independent claim. In this known device, the winding of the wire about the wire guide cylinders generates two layers of wires which cross at an angle than zero. To obtain parallelism between the wires of one layer relative to those of the other layer in the direction of movement of the piece to be sawed, the known device comprises a series of guide rollers interspaced between the wire guide cylinders.

The presence of these rollers renders the construction complicated and of a largely greater size. Considerable forces are moreover generated at the level of these guide rollers which are subjected to rapid wear.

The present invention has for its object to overcome these drawbacks and to provide a sawing device with at least two layers of crossing wires and which permits obtaining sawed slices with parallel and flat surfaces without the use of guide rollers.

The device according to the present invention is characterized to this end by the fact that it comprises means to carry out relative displacement between the piece to be sawed and the layers of wires in a direction of relative movement and adjustment means to adjust the angle of inclination comprised between said direction of said relative movement and a perpendicular to a working plane in which are contained the axes of two adjacent wire guide cylinders, this angle of inclination being determined and adjusted so as to obtain slices with parallel surfaces.

With these characteristics, there is obtained a sawing device of a less complicated construction and generally reduced size, whilst permitting the sawing of slices with parallel and flat surfaces. By adjusting precisely said angle of inclination, perfect parallelism of the surfaces of the sawed slices can be obtained without resorting to guide rollers.

There are thus used at least two layers of wires making a sufficient angle with the direction of cutting. The crossing of the layers relieves the problem of waves because these latter will no longer be parallel but will be of different angle on opposite sides of the obtained slices, which gives the possibility of a subsequent correction by lapping or by truing. The use of two wire guides according to a preferred embodiment in the wire sawing device permits providing in a simple manner, by winding of the crossing wire in figure 8 configuration between the two wire guides, the two directions of sawing having a sufficient angle to create the required effect to diminish the problem of possible waves. It is particularly important to note that this configuration, the shear stresses induced in the support by the two layers having different angular directions from the direction of sawing, hence the advance of the support table, are considerably reduced. Moreover, the angular position of the layers of wires relative to the movement of the support table, and hence of the piece to be sawed, increases the cutting pressure on the surface of the piece to be sawed and thus permits a higher speed of cutting, increasing at the same time the productivity of the sawing device per wire. The necessary angle between the two layers should be at least 20° if it is desired to obtain substantial crossing effect. However, beyond 90°, the sawing time begins to decrease the economic interest in the use of crossing layers.

Because the wire is wound about each of the wire guide cylinders about at least 120° of the circumference of the cylinder and passes in a straight line from one guide cylinder to another, and hence without passing by a guide member such as a guide cylinder or deflector, there is obtained a high crossing angle of the layers and a very good alignment and optimum parallelism of the wires of a layer. The invention therefore permits providing a high performance wire sawing device having high productivity, improved average precision by the decrease of geometric irregularities and the decrease of internal tensions in the piece to be sawed (which is often a material highly sensitive to external forces) in the course of sawing.

Preferably, this angle of inclination is determined and adjusted as a function of the distance separating two adjacent grooves on the wire guide cylinders, the diameter of these latter, and the distance separating these latter.

During changing one of these three parameters, the occasion will arise to adjust the angle of inclination, which will again permit obtaining slices with exactly parallel surfaces.

Other advantages will appear from the characteristics set forth in the dependent claims and from the expository description hereinafter of the invention in greater detail, referring to the drawings, which show schematically and by way of example one embodiment and modifications.

BRIEF DESCRIPTION OF THE DRAWINGS

FIG. 3 is a plan view perpendicular to the wire guide cylinders.

FIG. 4a is a side view of an inclined wire guide cylinder and FIG. 4b is a plan view of the inclined wire guide cylinder such that the projections of the wires appear parallel.

FIG. 5 is a front view of the two wire guide cylinders.

DETAILED DESCRIPTION OF THE PREFERRED EMBODIMENTS

Figure 1:
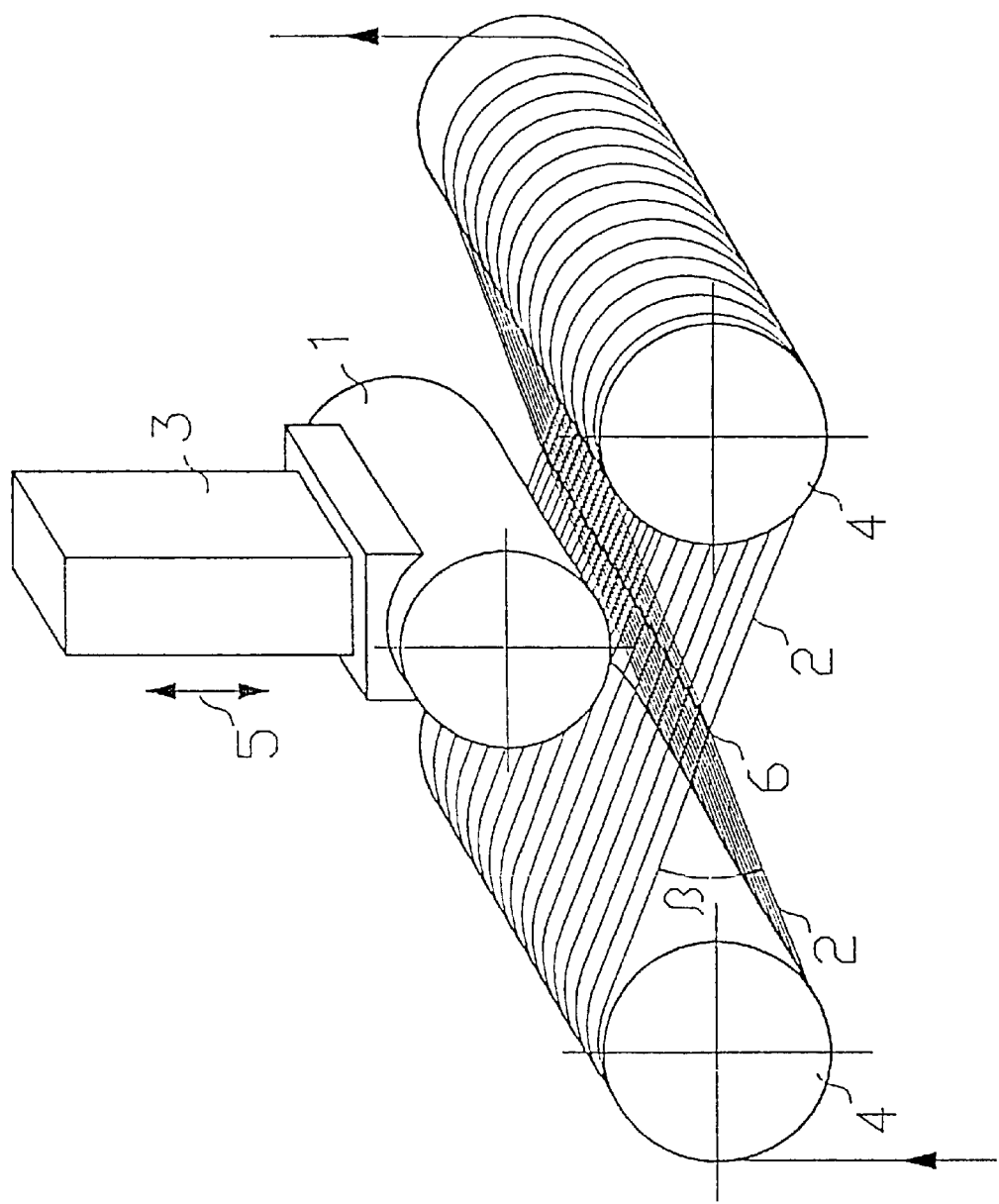
FIG. 1. shows in perspective the principle of the invention.

FIG. 1 shows in perspective the piece 1 to be sawed, bearing against the crossing layers of wires 2 supported by wire guide cylinders 4. The support table 3 to which is secured the piece 1 to be sawed moves in the direction 5. The crossing of the layers takes place along the line 6 with an angle β.

Figure 2:
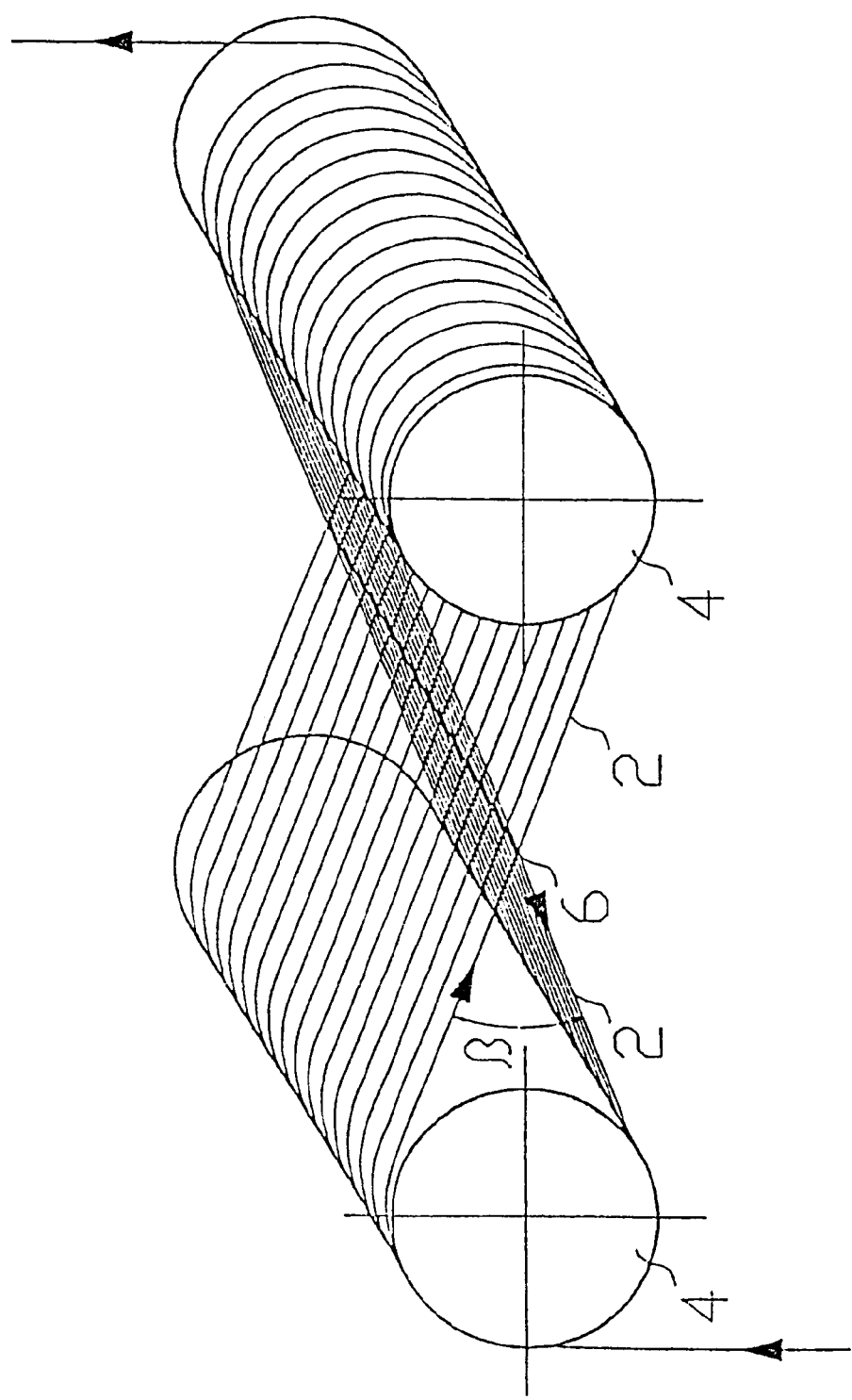
FIG. 2 shows an embodiment with two wire guide cylinders.

FIG. 2 shows the winding of the wire 2 on the wire guide cylinders 4. The wire 2 passes over the upper portion of the first cylinder at the left, then in a straight line to the lower portion of the second cylinder, and is wound about the circumference of this second cylinder about an angle of at least 120°, in the case about 200°, and then returns in a straight line to the lower portion of the first cylinder where it also occupies about 200° of the circumference of this cylinder, and so on. By this FIG. 8 winding, there are thus formed two layers of wires 2 whose wires extend from one cylinder to another in a straight line without being deflected by a guide or deflecting member and cross at an angle β greater than zero which is in any case greater than 20° to constitute a regular figure 8 winding. The angle β is determined by the diameter of the cylinders 4 and the spacing separating the axes of these latter.

FIG. 3 shows a view in a plane perpendicular to the working plane 16 determined by the axes 20 of the two wire guide cylinders 4.

It will be seen that the slices 10, 11, 12, etc., sawed in a direction of displacement 5 of the piece to be sawed, which corresponds to a perpendicular 15 to the working plane, have zigzag non-parallel surfaces.

When it is desired to obtain slices with parallel surfaces, it is hence necessary to modify the angle between said direction of movement 5 and the perpendicular to the working plane 16. This can be done by adjusting a predetermined angle of inclination δ between the direction of movement 5 and the perpendicular 15 to the working plane 16, as is shown in FIG. 4a. This predetermined angle of inclination lies in an adjustment plane 17 which is perpendicular to the working plane 16 and parallel to the axes of the two wire guide cylinders 4. This angle δ can be determined from the formula $$\delta = \arctan \frac{P}{2d}$$

where

P=the distance separating two adjacent grooves 14 on the wire guide cylinders 4;

d=the distance separating the upper and lower straight lines 18, 19 joining the points of tangential contact of the two layers on a wire guide cylinder 4.

According to FIG. 5, the distance d is given by the formula $$d = D \times \cos\left(\arcsin\frac{D}{L}\right) = D \times \left(1 - \frac{D^2}{L^2}\right)^{1/2}$$

where

D=the diameter of the wire guide cylinders 4;

L=the distance separating the axes 20 of the wire guide cylinders 4.

Thus, in the case of FIG. 4b, the direction of movement 5 is perpendicular to the sheet of drawing and the perpendicular 15 to the working plane 16 is inclined by a predetermined angle δ relative to the direction of movement 5. Similarly, the axes 20 of the wire guide cylinders are inclined at an angle δ relative to the plane of the sheet of drawing. In this position, the wires 2 of the two layers appear parallel in projection, and the slices obtained therefore have two parallel surfaces.

In the case of the most usual applications and machines, the angle of inclination δ is very small, of the order of 20'.

The thickness e of the slices obtained correspond substantially to half that obtained with a single layer of non-crossing wires with a spacing P:

$$e = P/2 \cos \delta - ef$$

where ef=the thickness of a wire coated with abrasive.

Thus, by using an angle of inclination δ corresponding to predetermined values of P, D and L, it is possible to obtain with layers of crossing wires, sawed slices with perfectly parallel surfaces.

The angle of inclination δ, once calculated, can be used in the sawing device in different ways, by inclination of the working plane, the displacement of the supporting table remaining unchanged, for example vertical, by mechanical inclination of the direction of movement of the support table and of the piece to be sawed, the working plane remaining fixed, for example horizontal, by simultaneous and controlled displacements of the piece to be sawed in a direction Y parallel to the axes 20 of the wire guide cylinders 4 and in the vertical direction Z perpendicular to the plane of sawing, the speeds of movements Z and Y being controlled so as to correspond an advance of the piece to be sawed corresponding to the angle of inclination δ.

Figure 6:
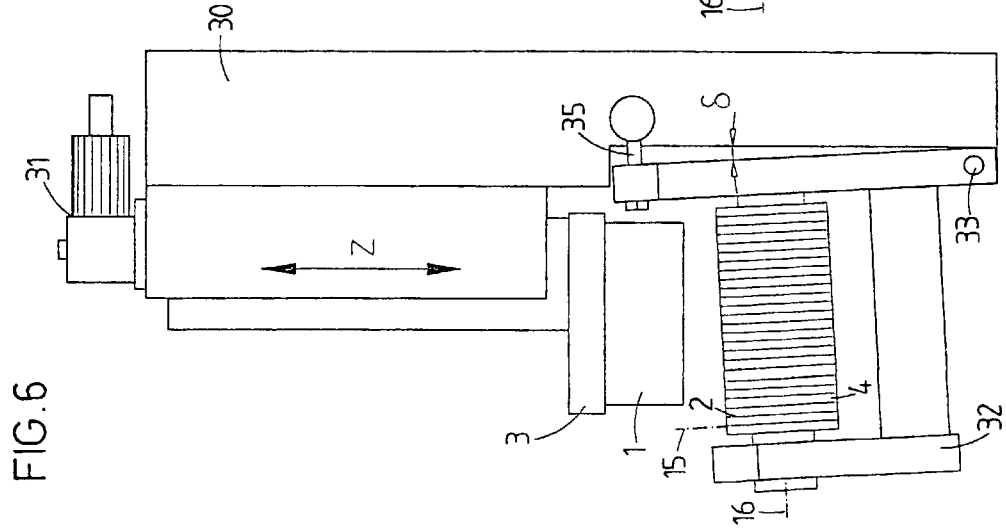

The sawing device shown in FIG. 6 has a chassis 30 on which is slidably mounted the support table 3 carrying the piece 1 to be sawed. A motor 31 permits displacing the support table 3 in an unchanging vertical direction Z.

The wire guide cylinders 4 are mounted on a frame 32 which is articulated on a pivotal shaft 33 perpendicular to said adjustment plane on the chassis 30. An adjustment mechanism 35 with a micrometric screw permits exactly adjusting the angle of inclination δ of the normal 15 to the working plane 16 relative to the vertical Z. This angle of inclination δ will remain unchanged for given values of P, D and L.

Figure 7:
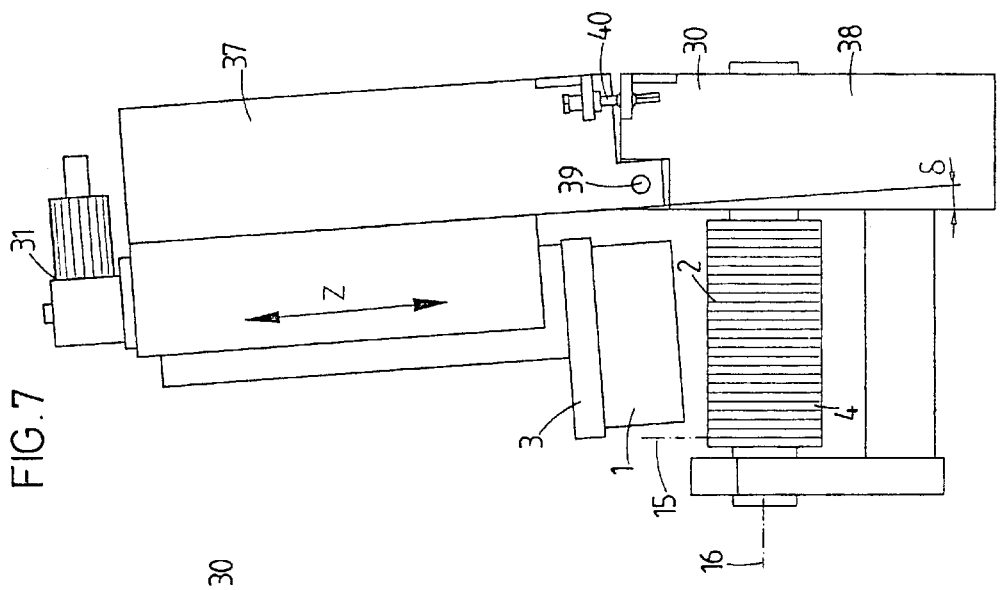

In the modification shown in FIG. 7, the normal 15 to the sawing plane is fixed. On the contrary, the chassis 30 comprises an upper portion 37 which is pivotally mounted on a base 38 by a pivotal shaft 39 perpendicular to said adjustment plane. An adjustment mechanism 40 with a micrometric screw permits adjusting precisely the angle of inclination δ of the direction of movement Z relative to the normal 15 to the working plane 16. There is thus obtained also slices with perfectly parallel surfaces, by crossing layers.

Figure 8:
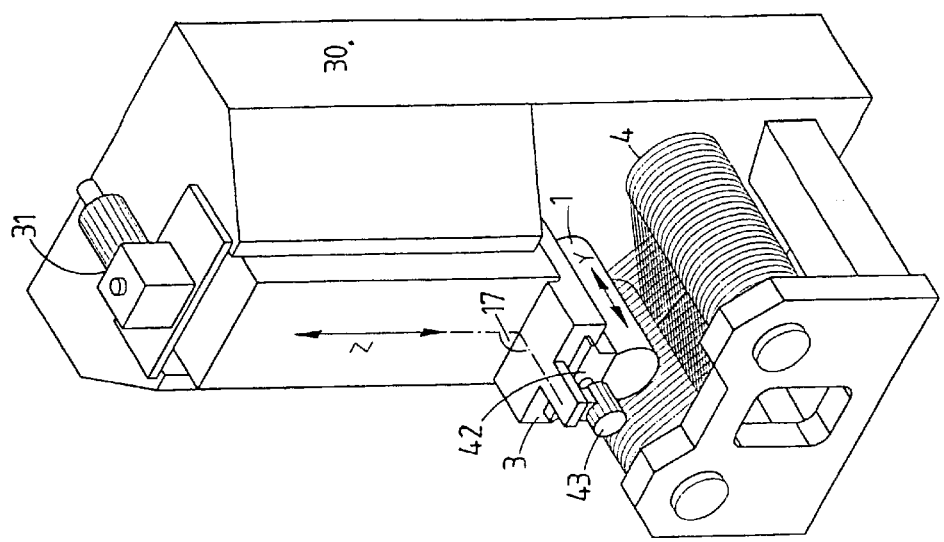
FIGS. 6 to 8 show three possible modifications to provide an angle of inclination between the direction of movement of the piece to be sawed and a perpendicular to the working plane.

The modification of FIG. 8 has a fixed chassis 30 on which is mounted a support table 3 movable in an unchanging vertical direction Z. The two wire guide cylinders 4 also have fixed axes that cannot be inclined.

The piece 1 to be sawed is mounted on a sliding table 42 which can be moved by a motor 43 in a direction Y parallel to the axes of the wire guide cylinders 4. Movement in the direction Y is precisely controlled to cause a combined advance in the directions Z and Y of the piece to be sawed in the adjustment plane 17 corresponding exactly to the angle of inclination δ which is given by the equation:

$$\tan \delta = \frac{V_Y}{V_Z}$$

in which $V_Y$ and $V_Z$ are the speeds of movement in the directions Y and Z.

It is of course understood that movement in the direction Y is much smaller than that in Z, for example 170 times smaller. Nevertheless, this precisely controlled movement in the direction Y is necessary to obtain slices having parallel surfaces.

It is of course possible to find other mechanisms permitting establishing exactly the angle of inclination δ.

Figure 9A:
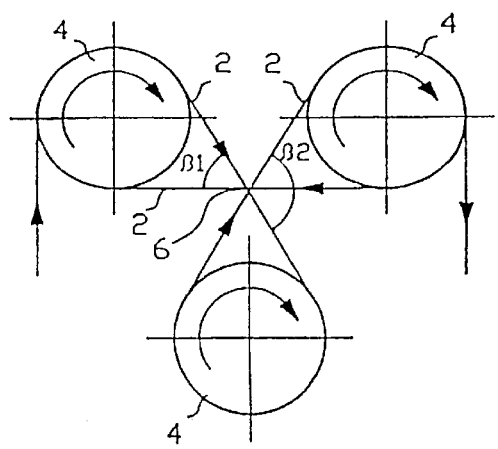
FIGS. 9a to 9c show schematically the winding of the wires on the wire guide cylinders in three modifications.
Figure 9B:
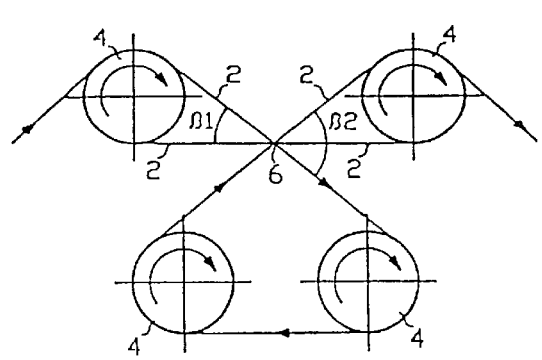
Figure 9C:
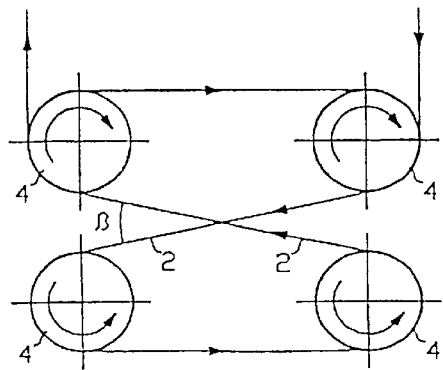

FIGS. 9a to 9c show other types of crossing layers with more than two wire guide cylinders.

FIG. 9a shows in side view a multiple crossing of three layers of wires 2 at point 6 by using three wire guide cylinders 4. The layers of wires 2 cross at angles β1 and β2. The wire 2 passes about the upper left cylinder, and passes in a straight line to the lower cylinder to rise about the upper right cylinder and then return in a straight line to the upper left cylinder. The wire is wound on each of the cylinders about an angle of about 240° of circumference and thus forms three layers of wires crossing at a single straight line.

FIG. 9b shows in side view a multiple crossing of three layers of wires 2 between four wire guide cylinders 4. The layers of wires 2 cross at point 6 at angles of β1 and β2.

FIG. 9c shows in side view a possibility for providing the crossing of two layers of wires 2 between four wire guide cylinders 4. The crossing 6 takes place at an angle β. The wire is wound about each of the four cylinders over an angle of 180° thereby permitting good guidance and parallelism of the wires of the two layers. Moreover, this type of winding does not require corrections of the angle of inclination δ.

The sawing wire forming the crossing layers of wires 2 between the wire guide cylinders 4 is constituted of spring steel of a diameter comprised between 0.1 and 0.2 mm so as to saw the box of hard material or of more particular composition, such as silica, ceramic, compounds of elements of groups III–V, GGG (gadolinium gallium garnet), sapphire, etc., in slices of about 0.1 to 5 mm thickness. The abrasive agent is a commercial product and can be diamond, silicon carbide, alumina, etc., in a form fixed to the filament or in free form in a slip.

The concept of crossed layers of wires without a supplemental deflection member acting on the wires and integrated with the wire sawing device, permits providing a high performance assembly producing slices of better quality thanks to the single or multiple crossing of the layers of wires 2 between two or more fixed or movable wire guide cylinders, without raising the cost of lowering productivity.

Of course the embodiments described above are not limiting and can be the object of any modification within the scope of claim 1. In particular, other types of crossings of layers of wires 2 can be envisaged which, because of the position of the layers of wires 2 relative to the direction of cutting, produce on the surfaces on opposite sides of the slices inclinations that are different from the waves due to the thermal or mechanical movements of the wire sawing device. For example, the winding of the wire about a number of wire guide cylinders 4 greater than two can produce three different layers of wires 2 having multiple crossings, which can take place along one or several straight lines. The different layers of wires 2 can cross at a single straight line or if desired can cross independently two-by-two at different straight lines. The winding of the wire 2 about the wire guide cylinders 4 can be complete or partial. It is however greater than 120° and preferably greater than 150° so as to obtain excellent holding of the wire on the cylinders, hence optimum parallelism of the wires of a layer.

Other combinations can also satisfy the concept of crossed layers of wires 2, embodying the concept of the invention of minimizing the shear forces induced by cutting the slices, on the piece 1 to be sawed and creating on opposite sides of the surface of the slices a different orientation of crossing defects possibly induced by the uncontrolled movements of the wire sawing device. It is also possible to provide wire sawing devices whose wire guide cylinders 4 are displaceable by means permitting varying the angle β of crossing of the layers of wires 2, either fixedly or continuously during the course of the work operation. A position with a practically zero angle of crossing facilitates for example the automatic loading of the wire, the angle between the layers of wires being then given according to the generation of the layers of wire 2 by the relative displacement of the wire guide cylinders 4. These means, for example jacks acting on the axle on at least one of the wire guide cylinders, could be actuated manually, electrically, pneumatically or hydraulically.

What is claimed is:

1. Wire sawing device comprising:
    at least two wire guide cylinders, a surface of said cylinders having grooves;
    a wire wound about said cylinders forming at least two layers of wire, said at least two layers of wire crossing at least one line with a crossing angle greater than zero degrees, said layers of wire being supported by said cylinders and held in position by said grooves;
    a spacing between segments of the wire being defined by said grooves, the wire being displaced by reciprocating or continuous movement while bearing against a piece to be sawed, said piece to be sawed being fixed on a support table;
    said wire being wound about each of said wire guide cylinders by at least 120° about a circumference of said cylinders;
    a motor to produce a relative movement between the piece to be sawed and the at least two layers of wire; and adjustment means to adjust an angle of approach of said piece to be sawed with respect to a perpendicular to a working plane, said working plane includes axes of two adjacent wire guide cylinders;

said angle of approach being determined and adjusted so as to obtain slices with parallel surfaces, said adjustment means being arranged to adjust said angle of approach in an adjustment plane, said adjustment plane being perpendicular to the working plane, said working plane being parallel to the axes of the two adjacent wire guide cylinders.

2. Device according to claim 1, comprising two of said wire guide cylinders, said wire being wound on said two wire guide cylinders while passing from an upper portion of a first wire guide cylinder in a straight line to a lower portion of a second wire guide cylinder and then returning from an upper portion of the second wire guide cylinder in a straight line toward a lower portion of the first wire guide cylinder to constitute a figure 8 winding, forming two layers of wire crossing at said crossing angle.

3. Device according to claim 1, wherein said angle of approach is predetermined and adjusted as a function of a distance (P) separating two adjacent grooves, of a diameter (D) of said wire guide cylinders, and of a distance (L) separating said wire guide cylinders.

4. Device according to claim 3, wherein the angle of approach is predetermined and adjusted according to the formula:

$$\delta = \arctan\frac{P}{2d}$$

P being the distance separating two adjacent grooves on the wire guide cylinders;

d being a distance separating points of tangent contact of two crossed layers on one of said wire guide cylinders;

d being determined by a formula:

$$d = D \times \cos\left(\arcsin\frac{D}{L}\right)$$

in which D is the diameter of said wire guide cylinders, and L is the distance separating axes of said wire guide cylinders.

5. Device according to claim 1, wherein the adjustment means comprise a mechanism to turn the wire guide cylinders about an axis of articulation perpendicular to said adjustment plane.

6. Device according to claim 1, wherein the adjustment means comprise a mechanism to turn a direction of the relative movement about an axis of articulation perpendicular to said working plane.

7. Device according to claim 1, wherein the adjustment means comprise a mechanism to move the piece to be sawed in said adjustment plane in a direction perpendicular to a direction of the relative movement.

8. Device according to claim 1, wherein said crossing angle is determined by a diameter of the wire guide cylinders and a spacing separating axes of the wire guide cylinders.

9. Device according to claim 1, wherein said crossing angle is at least 20°.

10. Device according to claim 1, further comprising at least three layers of wires crossing.

\* \* \* \* \*